Oct. 25, 1927.  
E. R. WILLIAMS  
1,646,469  
ARTIFICIAL LIMB AND METHOD OF MAKING SAME  
Filed Sept. 10, 1924   2 Sheets-Sheet 1
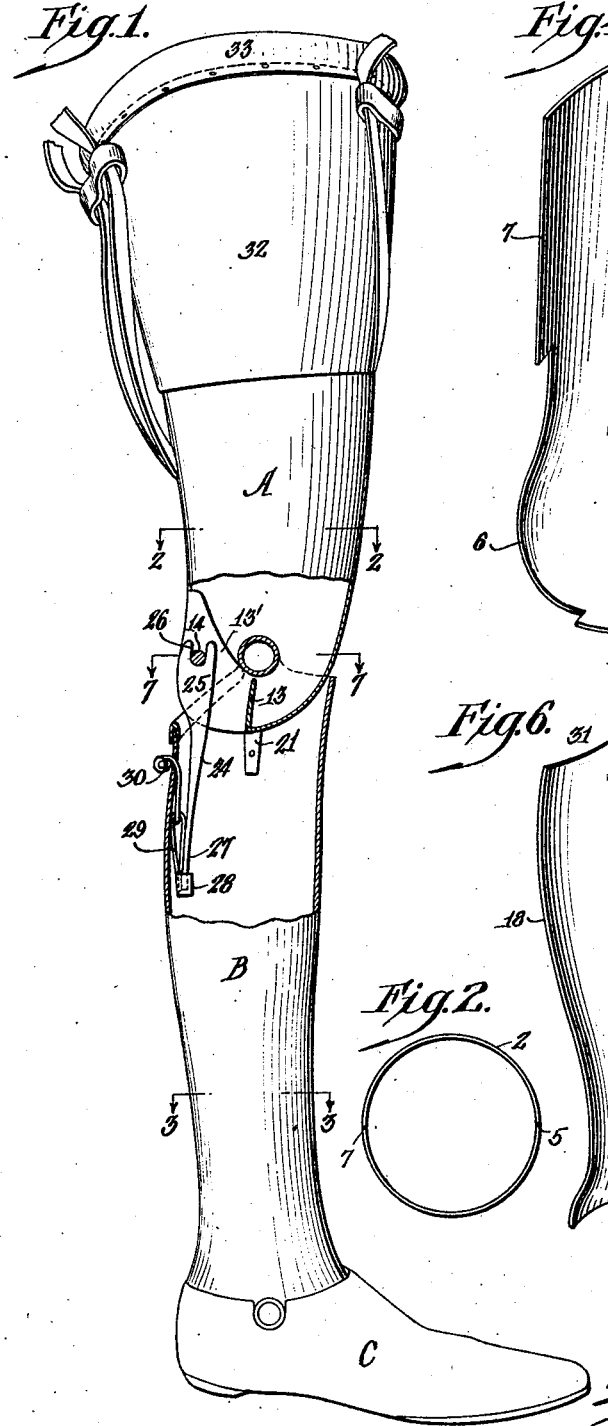
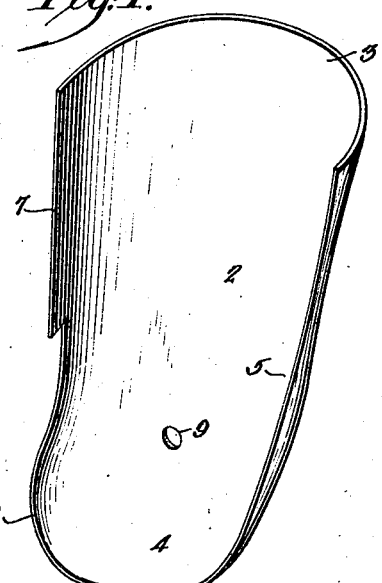
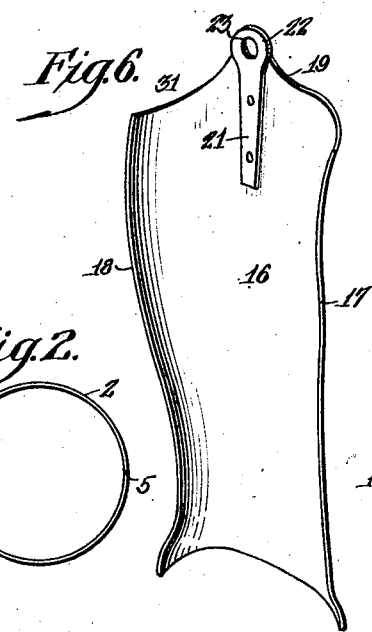
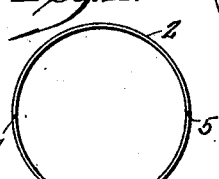
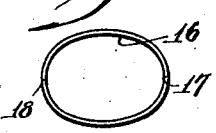
Inventor  
Edwin R. Williams  
by J. Stuart Freeman,  
Attorney.

Oct. 25, 1927.　　　　　　　　　　　　　　　　　　　　1,646,469
E. R. WILLIAMS
ARTIFICIAL LIMB AND METHOD OF MAKING SAME
Filed Sept. 10, 1924　　　　　　2 Sheets-Sheet 2
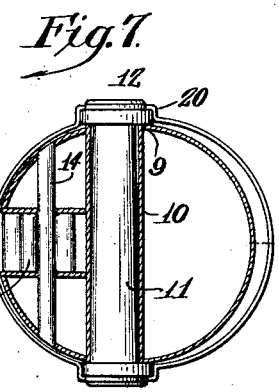
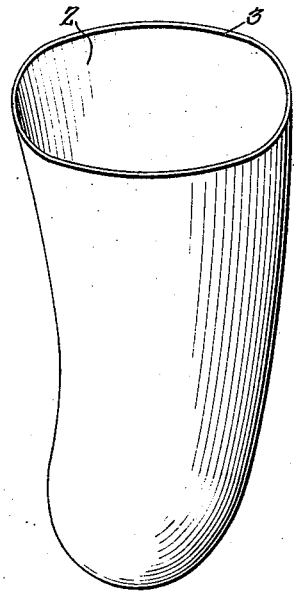
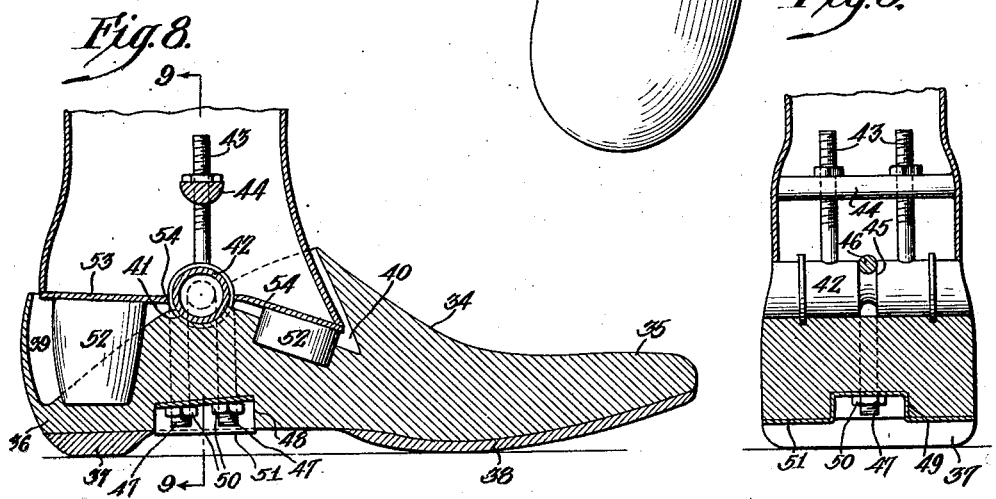
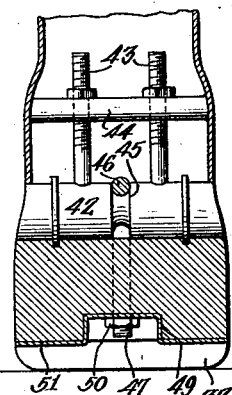
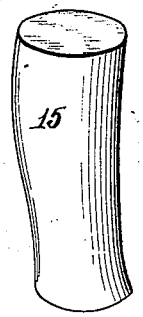
Inventor
Edwin R. Williams
by J. Stuart Freeman,
Attorney.

Patented Oct. 25, 1927.

1,646,469

UNITED STATES PATENT OFFICE.

EDWIN R. WILLIAMS, OF PHILADELPHIA, PENNSYLVANIA.

ARTIFICIAL LIMB AND METHOD OF MAKING SAME.

Application filed September 10, 1924. Serial No. 736,821.

The object of this invention is to provide improvements in artificial limbs and in the method of making the same.

The usual artificial limb is made of wood, though some have been made of sheet metal but with only partial success towards the desired end. The wooden limb is difficult to make, due to the necessity of hollowing out the interior of the leg from which the shin in particular is made, besides its being susceptible to the deteriorating effects of atmospheric changes, liable to split or crack, and offering difficulties in final finishing including a complete covering of rawhide, though in the end this type of limb possesses a relative lightness in weight. Furthermore, a wooden shin presents difficulties when it comes to properly securing the thigh and foot together, together with their hinged connections thereto, as the connection of these latter elements demands the use of screws, rivets and bolts which loosen and create objectionable noises as the limb is subjected to prolonged usage, besides tending to split the wooden parts to a degree which increases as the weight of the latter is lessened.

On the other hand, when substituting most metals for wood, increased rigidity is obtained, together with a more permanent connection between the shin, thigh and foot elements, but these same metals have offered other drawbacks which are characteristic of themselves. For instance, some metals, such as copper and brass, can be drawn, spun and hammered into desired shapes, and can be welded or soldered at their joints and to other elements, but they are much too heavy when of sufficient gauge to withstand the tendency of blows to dent them, and to resist the crushing effect of a person's weight. Iron and steel, though resistive to compression strains, readily rust, particularly when fluids such as perspiration and other human excretions touch them. Therefore, by elimination, we come to aluminum, which is certainly light enough in weight, and can be shaped about forms, but which presents the objections of insufficient rigidity to support one's weight, cannot be welded commercially when in thin gauge sheets, and is too easily dented and bent to maintain its predetermined shape. For any of these metals, it should be stated that to form a hollow tubular shin or thigh is objectionable in that the requisite succession of dies is tremendously expensive even for a leg of a given size, and a shin or thigh of a given size could certainly not be used for persons whose natural limbs are larger or smaller, stouter or more slender, besides the fact that the ends of drawn shins and thighs cannot be rounded easily and otherwise shaped as desired, wherefore drawing is commercially impracticable—persons requiring artificial limbs universally demand a "tailor-made" article and not a standard, relatively shapeless shin and associated elements which totally lack individuality of appearance, fit, contour, etc.

Thus, we come to the one metal alloy—duralumin—developed during the World War, that has been known by artificial limb manufacturers to possess substantially all of the required characteristics, but which until recently offered obstacles to its use in commercial individual limb manufacture due to the difficulty in welding its seams, some stating that it cannot be done, and others evading the issue by riveting strips of metal over the seams. This most important detail of welding being the key to the solution of the entire problem, and it having been mastered, an object of the invention is to provide a method by which artificial limbs can be formed of duralumin sections about models so as to embody the exact shape and measurements of the natural limb of the user, and the seams of the sections welded together and then ground and burnished so that it is impossible to detect in most cases the lines of union, even in the absence of a rawhide or other covering which with duralumin becomes unnecessary.

From such a hollow, tubular, humanly shaped duralumin shin, in association with other elements, including the foot and the thigh when necessary, an object is to provide an improved artificial limb, having a weight lighter than that of wood by as much as 30% to 50%, of compression and tensile strengths nearly equal to that of steel, capable of receiving and maintaining many desired finishes, and offering many advantages for securing related elements to it, besides making it possible to incorporate in the ends of the shin and thigh members any shape which may be desired in order to correspond with that of the natural limb, or which may be desired for mechanical reasons.

Still another object is to provide a method of making artificial limbs, and particularly the shin and thigh members, which consists broadly in forming a model preferably from a wooden block, to conform in shape and size with the remaining limb of the individual, or to the natural limb as it should be according to known ideal shapes and dimensions, said block being radially less in size than the natural limb only enough to equal the thickness of the particular gauge of duralumin used, then hammering or otherwise shaping sections of sheet duralumin about said model, shaping the end portions of said sections as hereinafter described, then welding together the adjacent seams of the duralumin sections, and grinding and burnishing said welded seams to obliterate all trace of the seam and the welding, after which the foot and shin, together with a thigh when required, are connected together as hereinafter described.

And a still further object is to provide in such an artificial limb a mechanically improved knee joint and its relation with the knee and shin members, as well as to provide a mechanically improved connection between the lower end portion of the shin member and the foot.

With these and other objects in view, the present invention comprises additional novel details of construction and operation hereinafter fully brought out in the following description, when read in conjunction with the accompanying drawings, in which:

Fig. 1 is a side elevation of one embodiment of the invention partly in section;

Fig. 2 is a section on the line 2—2 of Fig. 1;

Fig. 3 is a section on the line 3—3 of Fig. 1;

Fig. 4 is a perspective view of one formed metal section from which the thigh is made;

Fig. 5 is a perspective view of the complete metallic thigh section;

Fig. 6 is a perspective view of one formed metal section from which the shin is made;

Fig. 7 is a horizontal section on the line 7—7 of Fig. 1;

Fig. 8 is a vertical fragmentary section of foot, lower portion of the shin, and the means for connecting them;

Fig. 9 is a section on the line 9—9 of Fig. 8;

Fig. 10 is a perspective view of a block shaped to correspond with one's thigh and about which the sections shown in Fig. 4 are shaped; and Fig. 11 is a perspective view of a block shaped to correspond with one's shin and about which the sections shown in Fig. 6 are shaped.

Referring to the drawings, one embodiment is shown as comprising, mainly, a thigh element A, a shin element B, and a foot element C. In order to make the thigh element, the exact dimensions of the thigh-stump of the person needing the limb are taken, and a preferably solid block of wood 1, such as that shown in Fig. 10, is shaped so as to comprise an exact model of said thigh-stump (not shown), with any exceptions as to details which may be dictated by experience towards the end of making a most comfortable fitting of the completed artificial limb upon the remaining portion of the limb of the wearer.

In order to form the thigh element A, as many sections of duralumin in sheet form are cut as desired, but in this instance said element is formed of but two sections, the left-hand section 2 of which is shown in perspective in Fig. 4, after the otherwise flat sheet has been repeatedly annealed and hammered, or otherwise shaped, so as to fit snugly and uniformly about the corresponding portion of the thigh model block 1. As hammering duralumin causes it to harden even after having been annealed, (precisely at 750° F.), it must be annealed repeatedly during the forming step in the process. Each of these thigh sections 2 comprises a substantially semi-cylindrical upper portion 3, which tapers downwardly and merges into a lower portion 4, which is substantially semi-cylindrical, or at least is cup-shaped in form with substantially cylindrical and but slightly tapering sides. The duralumin thigh element, after being formed, welded, ground and polished, is finally tempered in order to restore to the element the uniform temper or hardness for which duralumin is noted.

The forward marginal edges 5 of the two thigh sections extend preferably straight downwardly along the medial line in the front of the thigh and the center bottom region of the cup-shaped portion 4, where this otherwise straight line terminates, at an offset recessed region 6, beyond which, toward the upper region of the rear of each thigh section, the straight marginal line 7 is continued. When the two thigh sections are joined together so that their marginal edges 5 and 7 fit substantially evenly, the seams thus formed are very delicately welded by the use of an acetylene or oxyhydrogen torch, additional duralumin and a suitable flux, with the result that the upper portion of the thigh element A is open to receive the thigh-stump, and the lower rear region of said element is open to provide an aperture 8, formed by the co-operation of the oppositely disposed recessed region 6.

The opposite side walls of the thigh sections are provided with aligned apertures 9, and a tube 10 positioned so as to extend between said apertures and having its opposite ends welded to the inner surfaces of the thigh elements immediately surrounding said apertures 9. Then a suitable pin 11 is placed within the tube 10, so that its end portions 12 project freely beyond the outer surface of said thigh element for a purpose hereinafter described.

In the lower portion of said thigh element a small plate of duralumin 13 is so positioned and welded as to extend vertically from the lowermost limit of the marginal edge 5 at its junction with its recessed portion 6 upwardly to a point but slightly spaced below the axes of the apertures 9. Extending rearwardly from the laterally opposite vertical edge portions of the plate 13 is a pair of substantially parallel plates 13′, which are not only welded or formed integral extensions of the plate 13, but at their rearmost edges are welded to the laterally opposite defining edges 6 of the recess 8.

Also extending between the diametrical opposite side of said thigh element, through the parallel plates 13′, and to the rear of the apertures 9, is a pin 14, shown both in Figs. 1 and 7, and hereinafter referred to. When a person has lost one limb only, the exact shape and dimensions of the remaining limb are carefully reproduced in a block 15 preferably made of wood and shown in Fig. 11, or if both limbs have been lost, this model shin block is made from known ideal shape and dimensions. In either case, two or more sheets of sheet duralumin are formed about this shin block. In the present instance, two such sheets are used, one sheet 16 being shown in Figs. 1 and 6. The sheet 16 is roughly a semi-cylinder, but instead of being uniform in diameter, it conforms to the calf of one's leg and thence merges into the more restricted dimension between the calf and the ankle, from which point it increases in size adjacent to that portion representing one's ankle. Here, as with the thigh element, the duralumin sections must be carefully annealed at 750° F., repeatedly and hammered into shape, after which the seams are welded, ground and polished, following which the shin element as a unit is tempered to restore its uniform hardness which the welding temporarily destroys.

The front and rear limitations are defined by preferably straight marginal edges 17 and 18, the corresponding edges of the two sections being joined and carefully welded as hereinbefore described in connection with the thigh element. The upper portion of the opposed sections of this shin element rises at 19 upon their opposite sides intermediate of the seams formed by the unions of the edges 17 and 18. The upper region of the central portion of each of the shin sections 16 may be bent outwardly to form a flattened U-shaped channel portion 20, in which a strap 21 is either welded or riveted, said strap being provided with an enlarged upper end 22, having an aperture 23, through which extends the adjacent end portion 12 of the pin 11.

This makes the apertured head 22 of said strap form a bearing, which, while possessing a normally long life, can be replaced when worn by removing said strap and substituting therefor a new strap of the shape of the one described. In the upper rear portion of the shin element B, a member 24 is provided of any suitable material, but preferably of wood or other non-metallic substance. The member 24 is provided with an upper enlarged portion 25, bifurcated to provide a recess 26, through which extends the pin 14, and against which pin the member 24 is finally forced by virtue of the lower tapering end portion 27 of said member resting within a stirrup 28, supported by an elastic band 29, secured in turn by any suitable means 30 to the upper end portion of the said shin element.

From this construction, it is obvious that with the proper tension provided on the elastic 29, the upward force exerted by the member 24 upon the pin 14 serves to normally maintain the thigh and shin elements in aligned position to represent the natural leg when extended, yet which construction permits the wearer, when in sitting position, to bend the thigh rearwardly and downwardly, the pin 14 in this instance forcing the member 24 downwardly and farther into the shin element against the pressure of the elastic 29.

The forwardmost limit of the thigh with respect to the shin may be predetermined in any suitable manner, as for instance by forming the uppermost frontal edge portion of the shin, so as to engage the lower forward curved portion of the thigh as shown in Fig. 1. The upper rear edge portion 31 of the shin element may be covered if desired by leather or other protecting material, and similarly the upper regions of the thigh element may be both internally and externally padded at 32, and cushioned at the upper extremity 33 so as to comfortably fit the thigh-stump without the necessity otherwise of the metallic thigh element coming into contact with the flesh of the wearer and chafing, bruising or otherwise injuring the latter.

The foot element C is formed of any suitable material to represent the outline or contour of a foot corresponding in shape and size with the other foot of the wearer, or corresponding with ideal dimensions, said foot comprising a body portion 34, having a toe section 35, and a heel section 36, beneath which latter is a cushioning member 37, while a cushioning sole member 38 is secured upon and beneath the ball and toe portions of the foot member. The upper rear portion of said member is cut out to provide substantially V-shaped recesses 39 and 40, said recesses being spaced apart, but between them said member being provided with a concavely curved surface 41, in which oscillates a pin 42, which is secured by bolts 43 to a bar 44, which extends between and is welded or is otherwise permanently secured to the diametrically opposite sides of the ankle portion of the shin element B.

The pin 42 is provided centrally with a circumferential groove 45, in which is positioned the upper portion of a U-shaped member 46, the opposite end portions of which latter are parallel and extend downwardly through the instep portion of the foot element, and project into a recess 48 in the said instep portion. Here the ends of the member 46 pass through apertures in the central U-shaped portion 49 of a metal stirrup, and are firmly secured in position by nuts or other fastening means 50. The laterally opposite ends 51 of the stirrup 49 extend laterally beyond the limits of the recesses 48 and uniformly against the under surface of the instep portion of the foot element in such manner as to distribute the pressure of the U-shaped member 46 over as large an area as possible, in order to prevent a loosening of the otherwise unyielding relatively oscillatable union between the shin and foot sections at the ankle as represented by the pin 42.

In the lower surfaces of the V-shaped recesses 39 and 40 cushion members 52 are provided, and secured against lateral movement in any suitable manner, said cushioning members at their upper limits bearing against a pair of duralumin plates 53 and 54, which are welded at their peripheral edge portions to the adjacent lower edges of the sections 16, which after being welded together comprise the shin element B, said plates being spaced apart a sufficient distance to form an aperture 54ª, in which is positioned the pin 42 and upper portions of the members 46, which together represent the ankle outline of a human or natural shin.

As hereinbefore referred to, after each of the thigh and shin elements have been formed by welding the respective sections together, the more or less irregular seams are ground and burnished so as to eliminate visible evidence that a seam exists at such points, after which these elements may be polished, plated, enameled or otherwise finished in any desired manner.

Having thus described my invention, what I claim and desire to protect by Letters Patent of the United States is:—

1. An artificial limb comprising a hollow thigh element having an aperture in its lower and rear portions, and a pair of plates within said thigh secured to the opposite edges of said aperture, a pin extending between the diametrically opposite side walls of said thigh element adjacent to said aperture and through said plates, a shin element, a member extending within said shin and normally engaging said pin, resilient means connecting said member to said shin, whereby a predetermined relative position is normally maintained between said elements.

2. An artificial limb comprising a hollow thigh element having an aperture in its lower and rear portions, and a pair of plates within said thigh secured to the opposite edges of said aperture, a pin extending between the diametrically opposite side walls of said thigh element adjacent to said aperture and through said plates, a shin element, a member extending within said shin and normally engaging said pin, resilient means connecting said member to said shin, whereby a predetermined relative position is normally maintained between said elements, a pivotal connection between said elements, and said elements being relatively movable about said pivot against the tension of said resilient means.

3. In an artificial limb, the combination of shin and foot elements, an axis pin, means to secure said pin to said shin element, means to secure said pin and permit its oscillation with respect to said foot element, said last-named means comprising a U-shaped staple having threaded shanks extending through said foot, a saddle plate positioned against the undersurface of said foot and apertured to permit said threaded shanks to extend therethrough, and nuts carried by said shanks to secure said shanks against removal through said saddle and foot, said saddle extending transversely across and operative to distribute the tension upon said staple shanks across the width of said foot.

4. An artificial limb comprising shin and foot elements, a pin carried transversely by said shin and engaging said foot, an apertured saddle upon the underside and extending across substantially the entire width of said foot, and a staple surrounding said pin and having shanks extending through said foot and said saddle, and means engaging the shanks of said staple and said saddle to prevent the separation of the shin from the foot, said saddle being operative to distribute the tension upon said staple shanks transversely across the width of said foot.

5. In an artificial limb, a hollow shin member, and a foot, in combination with a staple carried by said foot, a pin extending transversely of said shin member and through said staple, a bar extending between and secured to the opposite sides of said shin member, and means to removably secure said pin to, and to support said pin from said bar.

In testimony whereof I have affixed my signature.

EDWIN R. WILLIAMS.